(No Model.)
I. E. LUCAS.
DRAFT EQUALIZER.
No. 413,072. Patented Oct. 15, 1889.
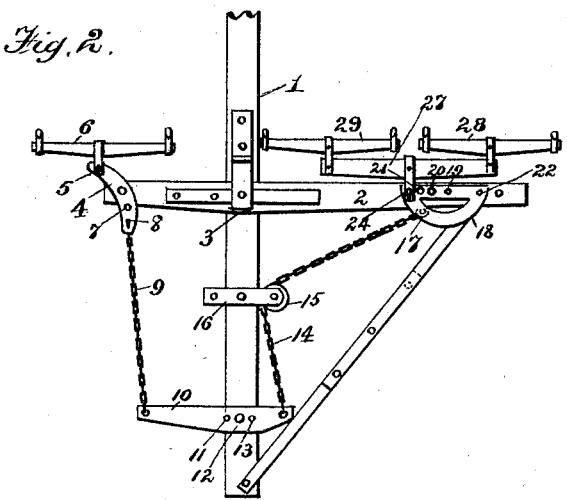
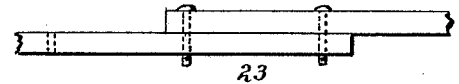
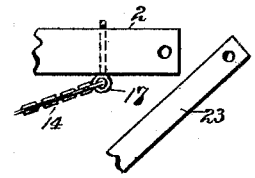
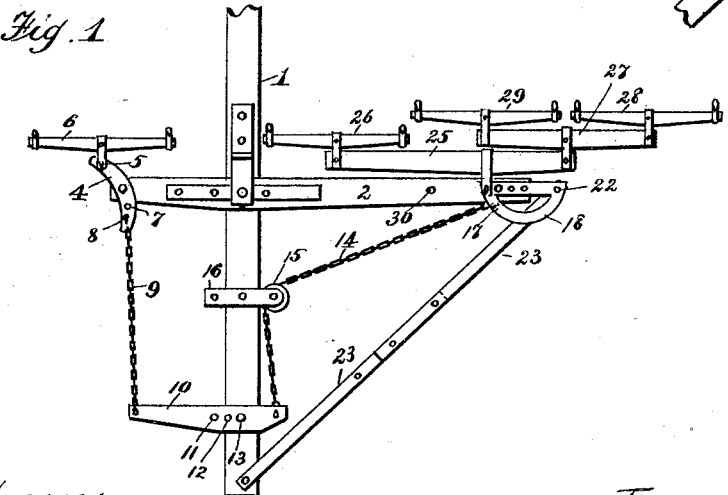
Witnesses:
J. P. Reed
F. H. Knight
Inventor:
Isaac E. Lucas
per Wm. H. H. Knight
his Atty.

UNITED STATES PATENT OFFICE.

ISAAC ELLIOT LUCAS, OF CLARKSVILLE, IOWA.

DRAFT-EQUALIZER.

SPECIFICATION forming part of Letters Patent No. 413,072, dated October 15, 1889.

Application filed April 18, 1888. Serial No. 271,024. (No model.)

*To all whom it may concern:*

Be it known that I, ISAAC ELLIOT LUCAS, a citizen of the United States, residing at Clarksville, in the county of Butler and State of Iowa, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in draft equalizers or eveners; and it consists, essentially, in the construction, arrangement, and combination of the several parts comprised therein for service, substantially as hereinafter described, and illustrated in the accompanying drawings, wherein similar figures of reference denote similar parts.

In said drawings, Figure 1 represents a top plan view of a draft equalizer or evener constructed in accordance with my invention and adapted to the use of four animals. Fig. 2 is a similar plan view, showing the device adapted to the use of three animals; and Figs. 3 and 4 represent detached detail views of parts of the mechanism comprised in my improvement.

While I have in the present embodiment of my invention shown, and shall hereinafter describe, my improvement as particularly adapted for use in connection with harvester binders, reapers, mowers, or devices of analogous character wherein a pole or tongue is employed, I yet do not desire to limit the use of such improvement solely to such devices, inasmuch as it can be readily adapted for use in connection with implements of a far different character—as, for instance, with plows, &c.—and fulfill in an equally satisfactory manner the purpose for which it was designed—viz., overcoming side draft incident to machines of the class named, and which is due (more especially in binders, reapers, and mowers) to the lateral projection of the grain-platform or cutter-bar beyond the body proper of the machine, and consequently beyond the track followed by the draft-animals, which, it is desirable, should be at one side of the standing grain or grass, that the latter may not be trampled upon. Heretofore the employment of either three or four animals abreast in connection with devices of the class above named has been attended with much difficulty, due to the fact that the space between the pole or tongue of the machine and the standing grain is only sufficient for one animal, and that consequently the remaining animals must be placed upon the opposite side of the pole or tongue, in which position they operate, in conjunction with the side draft, (incident to all machines of the class named,) to throw the pole or tongue of the machine inward, and to thus force the near animal into the standing grain or grass despite his best efforts.

By my improvement I obviate the difficulty above set forth and provide means whereby the pole or tongue is maintained in proper position and free from the influence of side drafts, thereby permitting the animals to exert their full strength in forward direction. To the accomplishment of this end I provide the pole or tongue 1 near the machine with a spreader-bar 2, preferably jointed at the point 3, at which it crosses the pole, and arranged (with relation to said pole) in the manner shown in Figs. 1 and 2—viz., projecting at one side of said pole to a greater distance than it does at the opposite side thereof. To one end (the shorter) of the spreader-bar 2, I pivot a crescent-shaped plate or clevis 4, one end of which carries a hook 5, to which the singletree 6 is secured in the usual manner. I provide the opposite end of the plate or clevis 4 with two or more apertures 7 8, to be pivoted on 2, as may be desired, to receive one end of a chain 9, that extends thence to one end (the longer) of an unequal-armed lever or evener 10, which is pivoted to the pole 1 near its junction with the machine.

I provide the lever or evener 10 with a series of apertures 11, 12, and 13, which receive the pivotal pin according as the power of the longer arm of the lever 10 is to be increased or diminished with regard to its shorter arm, as will be readily seen.

A chain 14 extends from the short arm of the evener 10 around a pulley 15, that is mounted in a swinging frame 16, secured to the pole, to a staple or eyebolt 17, which projects from the long arm of the spreader-bar 2, near the outer end thereof. To the upper surface of the spreader-bar, near the staple 17, I pivot a second crescent-shaped plate or clevis 18 and provide the same with three or more apertures 19, 20, and 21, which may in turn receive the pivotal pin, according as it is desired to make the opposite arms of said plate or clevis of equal or unequal lengths, to correspond with the changes of position of clevis 18. I pivot the plate or clevis 18 at 22 to one end of an adjustable strut bar or rod 23, the opposite end of which is pivoted to the pole 1, near the inner end thereof, as shown. I provide the remaining end of the plate or clevis 18 with a hook 24, to which I connect in suitable manner an unequal-armed lever 25, to one arm of which, (the longer,) near its outer end, is connected a singletree 26. To the opposite shorter arm of the lever 25, near its outer end, is connected a doubletree 27, the opposite ends of which latter are connected to singletrees 28 and 29, respectively.

As described, the equalizer is adapted to the use of four animals. When desired, the device may be adjusted so as to be used with three animals. To this end I remove the lever 25 and uncouple the doubletree 27 therefrom. I now pivot the clevis 18 to the spreader-bar 2 at the point 30, passing the pivotal pin of said clevis through the apertures 19, 20, and 21. When desired, I shorten the strut 23 to suit the new position of the clevis 18 and change the staple or eyebolt 17 of the spreader-bar 2 to the point indicated by dotted lines 31, shortening the chain 14 to suit. I now pass the pivotal pin of the evener 10 through the aperture 12 therein and connect the doubletree 27 to the hook 24 of the plate or clevis 18, all as shown in Fig. 2.

I have found by practice that my improved equalizer, when arranged for the use of either three or four animals, as hereinbefore described, not only obviates side draft, but also enables me to swing the pole or tongue of the machine from side to side with ease.

The operation of my improvement will be understood without further description.

Modifications in detail of construction may be made in my improvement without departing from the spirit or sacrificing the advantages thereof. I therefore claim the right to make such changes therein as shall properly fall within the scope of my invention.

Having thus described my invention, I claim and desire to secure by Letters Patent—

1. A draft-equalizer comprising a pole, an unequal-armed spreader-bar pivoted to said pole to swing thereon, a strut, swinging connections between said strut and spreader-bar, an evener, and connections between said evener and spreader-bar, substantially as described.

2. In a draft-equalizer, an unequal-armed spreader-bar, a plate or clevis pivotally connected thereto, a strut pivotally connected to said clevis, an evener, and chains connecting said evener and said spreader-bar, substantially as described.

3. In a draft-equalizer, an unequal-armed flexible spreader-bar having each end provided with pivoted clevis or plate, a pole or tongue, a strut connecting said pole or tongue and one of said clevis-plates, an evener, and connections between said evener and said spreader-bar, substantially as described.

4. In a draft-equalizer, a pole or tongue, an adjustable evener pivoted thereto, a flexible spreader-bar, adjustable clevis-plates pivoted to said spreader-bar, a strut connecting one of said plates with said pole, a pulley pivoted to said pole, and chain-connections between said evener, spreader-bar, and pulley, substantially as described.

5. In a draft-equalizer, a spreader-bar, an unequal-armed doubletree, a strut, and a plate or clevis pivotally connected to said spreader-bar, doubletree, and strut, substantially as described.

In testimony whereof I affix my signature in presence of two witnesses.

ISAAC ELLIOT LUCAS.

Witnesses:
R. W. THOMPSON,
A. J. ILGENFRITZ.